United States Patent
Hazard et al.

(10) Patent No.: US 6,363,862 B1
(45) Date of Patent: Apr. 2, 2002

(54) POWER PICK-UP ASSEMBLY AND CORRESPONDING RAILWAY VEHICLE

(75) Inventors: Laurent Hazard, Marcq; Eric Benard, Paris, both of (FR)

(73) Assignee: Alstom, Paris (FR)

(*) Notice: Subject to any disclaimer, the term of this patent is extended or adjusted under 35 U.S.C. 154(b) by 0 days.

(21) Appl. No.: 09/708,654

(22) Filed: Nov. 9, 2000

(30) Foreign Application Priority Data

Nov. 10, 1999 (FR) .............................. 99 14165

(51) Int. Cl.$^7$ ................................. B61F 5/10
(52) U.S. Cl. ............... 105/199.1; 191/60.5; 191/65; 191/66; 191/68
(58) Field of Search ............. 105/261.1, 199.1; 191/69, 66, 68, 55, 58, 60.5

(56) References Cited

U.S. PATENT DOCUMENTS

| | | | | |
|---|---|---|---|---|
| 1,728,819 A | * | 9/1929 | Bower | 191/68 |
| 1,824,871 A | * | 9/1931 | Clarke, Jr. | 191/68 |
| 2,935,576 A | * | 5/1960 | Faiveley | 191/68 |
| 3,830,990 A | * | 8/1974 | Gray | 191/55 |
| 3,889,788 A | * | 6/1975 | Littler et al. | 191/40 |
| 4,471,175 A | * | 9/1984 | Gronlund | 191/66 |
| 5,124,510 A | * | 6/1992 | Garfinkle | 191/65 |
| 5,386,895 A | * | 2/1995 | Ohuchi | 191/60.5 |
| 5,709,292 A | * | 1/1998 | Breitbach et al. | 191/65 |
| 6,152,273 A | * | 11/2000 | Kilkenny | 191/58 |
| 6,273,001 B1 | * | 8/2001 | Amigot et al. | 105/199.1 |

FOREIGN PATENT DOCUMENTS

| | | | |
|---|---|---|---|
| DE | 29613541 U1 | * | 6/1997 |
| EP | 0436993 A1 | * | 7/1991 |
| EP | 0485273 B1 | * | 11/1996 |
| EP | 0 785 100 A1 | | 7/1997 |
| EP | 0 936 100 A1 | | 8/1999 |
| JP | 4 172 901 A | | 6/1992 |

* cited by examiner

Primary Examiner—S. Joseph Morano
Assistant Examiner—Lars A. Olson
(74) Attorney, Agent, or Firm—Sughrue Mion, PLLC

(57) ABSTRACT

This power pick-up for a railway vehicle comprises a pantograph (4) and a pantograph support (7), the pantograph support (7) comprising a stationary chassis (8) for mounting on the roof (2) of a railway vehicle (3), and a mobile chassis (9) carrying the pantograph (4) and connected to the stationary chassis (8) to tilt laterally with respect thereto on each side of a position of rest. The mobile chassis (9) is connected to the stationary chassis (8) by two tilting rigid lateral supports (14), each tilting support (14) being articulated, on the one hand, to the stationary chassis (8) at two longitudinally-spaced points (17) and, on the other hand, to the mobile chassis (9) at two longitudinally-spaced points (22).

10 Claims, 4 Drawing Sheets

POWER PICK-UP ASSEMBLY AND CORRESPONDING RAILWAY VEHICLE

BACKGROUND OF THE INVENTION

The subject of the present invention is a power pick-up assembly for a railway vehicle, of the type comprising a pantograph and a pantograph support, the pantograph support comprising a stationary chassis for mounting on the roof of a railway vehicle, and a mobile chassis carrying the pantograph and connected to the stationary chassis to tilt laterally with respect thereto on each side of a position of rest.

The invention applies, in particular, to a tilting railway vehicle.

Such a railway vehicle is designed so that its body shall adopt a lateral inclination with respect to the axis of the axles of its bogies in the curved parts of railway lines.

If an assembly is mounted on top of the railway vehicle for picking up power from an overhead power line, it then becomes necessary for the pantograph to be inclined laterally with respect to the body in the opposite direction to the direction in which the body is inclined with respect to its axles, so as to limit the lateral movement of the collector bow of the pantograph with respect to the contact line of the overhead power lines.

This is because if there were no such inclination of the pantograph in the opposite direction, known as tilt compensation inclination, the relative movement of the collector bow with respect to the contact line could be great enough for the line to be in contact only with the insulated parts of the collector bow or even spaced laterally from it, and this could cause damage to the overhead line and to the pantograph, particularly as the body returns to its position of rest.

Document EP-A-785,100 describes a power pick-up assembly of the aforementioned type in which the mobile pantograph support chassis is connected by four link rods to the stationary chassis. At rest, that is to say when there is no tilt compensation, the points of articulation of the link rods transversely form a downwards-converging trapezium. The lateral movement of the mobile chassis causes the pantograph to be inclined laterally with respect to the body.

The lateral movement of the mobile chassis is brought about by means of one or more rams which thrust the mobile chassis laterally and which is or are arranged on one side or both sides of the pantograph support. A control system steers the ram(s) to move the mobile chassis and provide the pantograph with tilt compensation.

To ensure satisfactory movement of the mobile chassis while at the same time limiting the unwanted movements in translation and rotation, it is appropriate to provide guides against which the mobile chassis slides, and to fit a central lateral ram on each side of the mobile chassis.

Correct operation of the power pick-up assembly therefore entails a complex bulky structure which is subject to dissipation of mechanical energy by rubbing at the guides which thus constitute wearing parts.

The substantial bulk of a power pick-up assembly of this kind is a particular hindrance in complying with size requirements imposed on railway vehicles without limiting the headroom available for the passengers within the vehicle.

SUMMARY OF THE INVENTION

One object of the invention is to provide a power pick-up assembly of the aforementioned type which allows the mobile chassis to be guided satisfactorily and which has a relatively simple structure.

To this end, the subject of the invention is a power pick-up assembly of the aforementioned type, characterized in that the mobile chassis is connected to the stationary chassis by two tilting rigid lateral supports, each tilting support being articulated, on the one hand, to the stationary chassis at two longitudinally-spaced points and, on the other hand, to the mobile chassis at two longitudinally-spaced points.

According to particular embodiments, the power pick-up assembly may comprise one or more of the following characteristics, taken in isolation or in any technically feasible combination:

- each tilting support comprises a yoke articulated by its branches to the stationary chassis, and two clevis mounts which extend the base of the yoke and which are articulated to the mobile chassis;
- each tilting support has a transverse profile with its concave aspect facing towards the inside of the power pick-up assembly;
- the clevis mounts of each tilting support are roughly orthogonal to the branches of the corresponding yoke;
- the points by which the tilting supports are articulated to the mobile and stationary chassis form, transversely, a trapezium which converges downwards when the power pick-up assembly is mounted on the roof of a railway vehicle and when the mobile chassis is in the position of rest A further subject of the invention is a railway vehicle comprising a power pick-up assembly mounted on the roof of the vehicle, characterized in that the power pick-up assembly is an assembly as defined hereinabove.

BRIEF DESCRIPTION OF THE DRAWINGS

The invention will be better understood upon reading the description which will follow, which is given merely by way of example and made with reference to the appended drawings, in which.

DETAILED DESCRIPTION OF THE INVENTION

Figure 1:
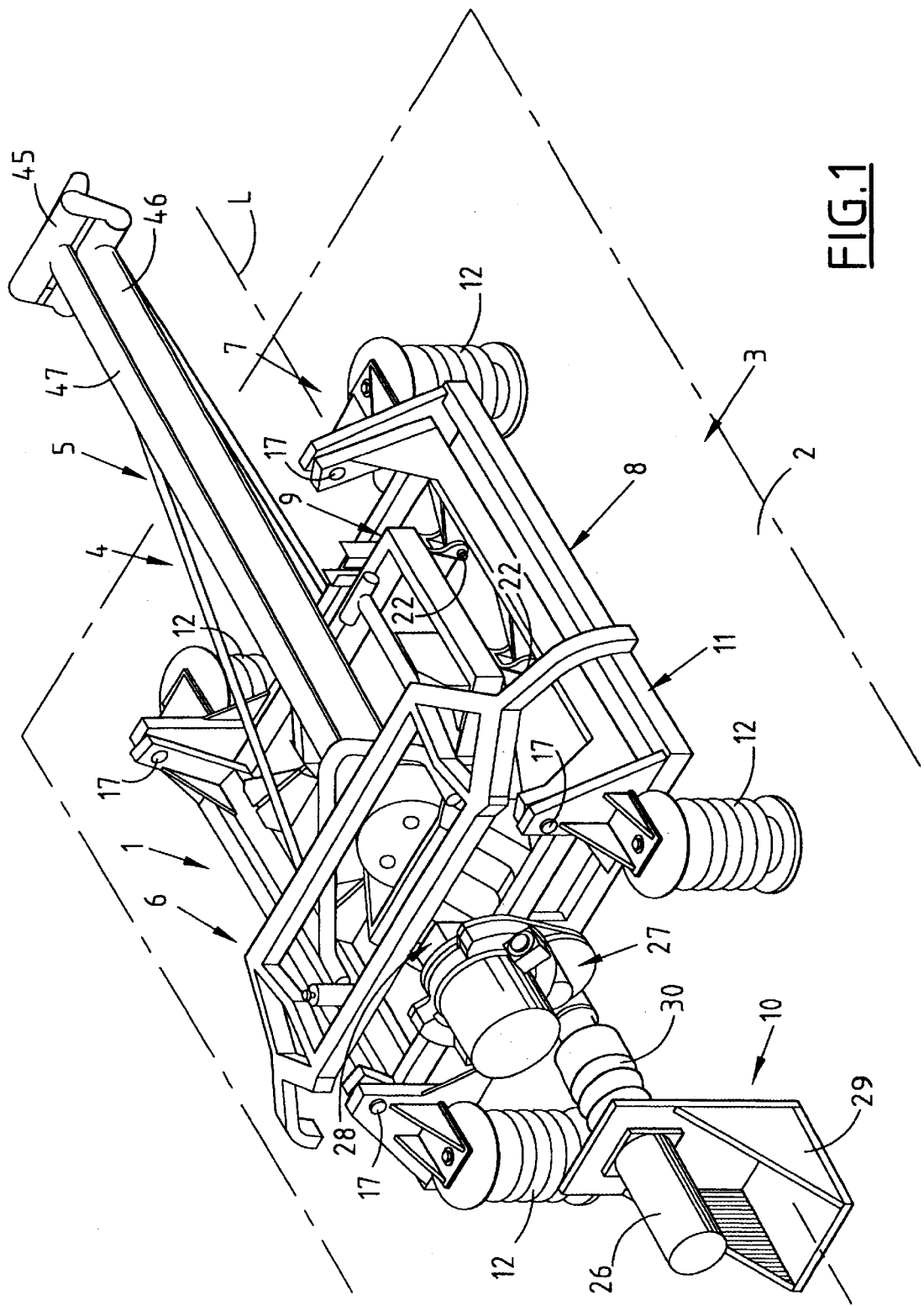
FIG. 1 is a diagrammatic part view in perspective illustrating the roof of a railway vehicle according to the invention.

FIG. 1 illustrates a power pick-up assembly 1 mounted on top of the roof 2 of a tilting railway vehicle 3. Only part of the roof 2 is depicted diagrammatically in chain line in FIG. 1.

This power pick-up assembly 1 essentially comprises:

- a pantograph 4 itself comprising an articulated arm 5 equipped with a collector bow 6 at an upper end,
- a pantograph support 7 itself comprising a stationary first chassis 8 and a mobile second chassis 9, and
- means 10 for moving the mobile chassis 9.

Figure 2:
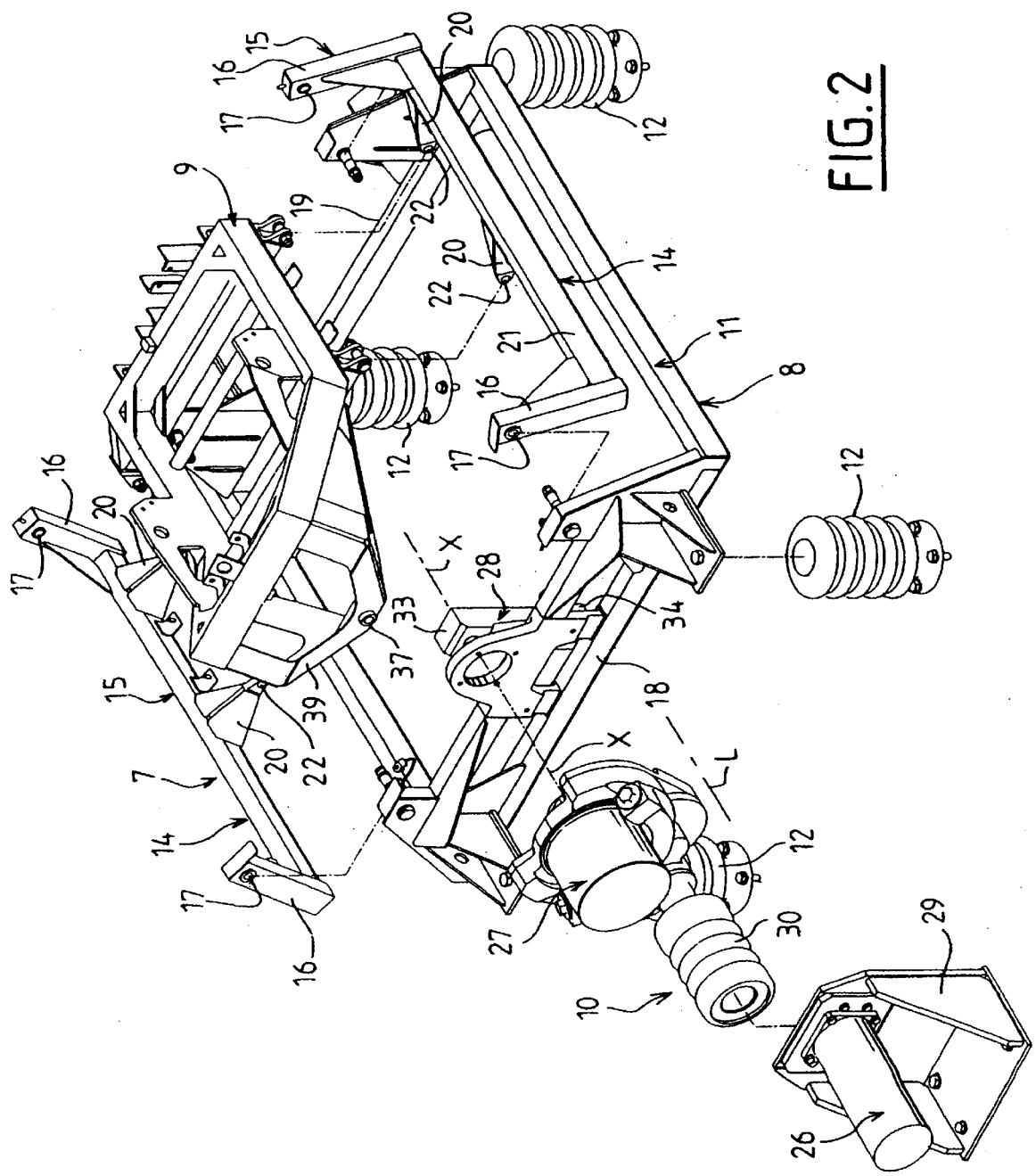
FIG. 2 is a diagrammatic view in exploded perspective of the pantograph support and of the means for moving the power pick-up assembly of the vehicle of FIG. 1.

For reasons of clarity, the depiction of the support 7 has been simplified in FIG. 1, but FIG. 2 illustrates its structure more fully.

The stationary chassis 8 comprises a frame 11 of roughly square or rectangular shape, and four electric insulators 12 one arranged at each corner of the frame 11, under the latter. The stationary chassis 8 is mounted on the roof 2 via the electric insulators 12 which form feet supporting the chassis 8 on the roof 2. The insulators 12 keep the stationary 8 frame 11 spaced away from the roof 2.

The mobile chassis 9 is a frame of smaller dimensions than the frame 11. The mobile chassis 9 is arranged inside the stationary chassis 8 and is connected thereto by two tilting rigid supports 14 arranged one on each side of the mobile chassis 9.

Each support 14 comprises a U-shaped part 15 or yoke, the two branches 16 of which are articulated at points 17 to the front side 18 and to the rear side 19 of the frame 11, and two lugs or clevis mounts 20, extending the base 21 of the yoke 15 downwards orthogonally to the branches 16, and which are articulated at points 22 to a lateral side of the mobile chassis 9.

The tilting supports 14 therefore, relative to the longitudinal direction L of the vehicle 3, have a cranked transverse profile, with the concave aspect facing towards the inside of the pantograph support 7.

The points 17 and 22 are points of articulation about axes which are parallel to the longitudinal direction L.

The points 17 of articulation of the branches 16 and, respectively, the points 22 of articulation of the lugs 20 of one same tilting support 14 are longitudinally aligned and spaced apart, that is to say are aligned and spaced apart in the longitudinal direction L of the vehicle 3.

Figure 4:
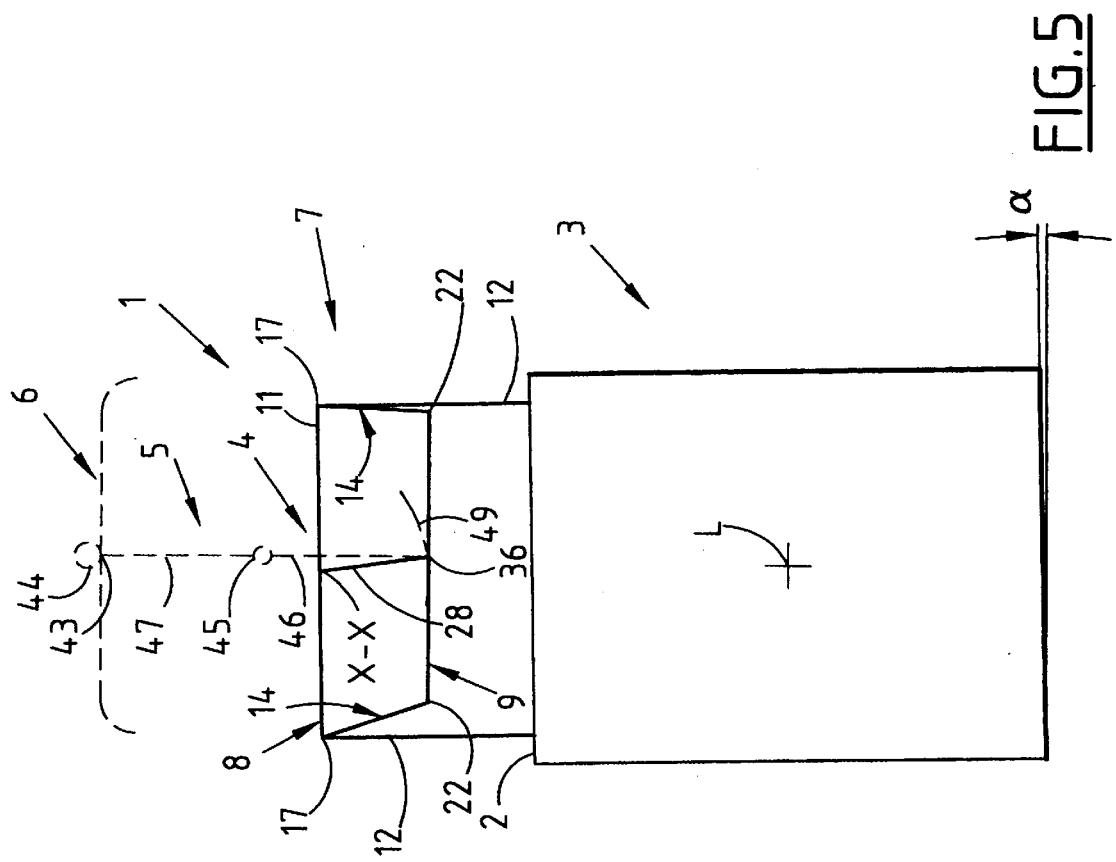

FIG. 4 diagrammatically illustrates the body of the vehicle 3 in the position of rest, that is to say in the absence of tilting, and therefore with its roof 2 parallel to the axis of the axles of its bogies and to the plane of a railway line on which the vehicle 3 is standing. In this figure, the plane of the railway line is assumed to be horizontal and only the body of the vehicle 3 and the power pick-up assembly 1 are depicted. The points 17 and 22 of articulation of the tilting supports 14 to the stationary chassis 8 and to the mobile chassis 9 therefore transversely form an isosceles trapezium converging downwards, that is to say converging towards the roof 2 of the railway vehicle.

It will be noted that in this FIG. 4, the tilting supports 14 have been depicted, for reasons of simplification, as having a straight transverse profile.

The distance laterally separating the points of articulation 17 of the two tilting supports 14 is about 870 mm. The distance laterally separating the points of articulation 22 of the two tilting supports 14 is about 760 mm. The distance transversely separating the points of articulation 17 and 22 of one same tilting support 14 is about 280 mm. The points 17 of articulation of the tilting supports 14 to the stationary chassis 8 are located 540 mm above the roof 2.

By virtue of the tilting supports 14 which form two laterally-spaced pivoting links, the mobile chassis 9 can tilt laterally with respect to the stationary chassis 8 on each side of its position of rest depicted in FIG. 4, the quadrilateral formed transversely by the points of articulation 17 and 22 thus deforming.

Because of the rigidity of the supports 14 and the longitudinal spacing of the points of articulation 17 and 22, the mobile chassis 9 is guided satisfactorily in its tilting movement, with limited unwanted movements in rotation and translation.

As can be seen in FIGS. 1 and 2, the means 10 of moving the mobile chassis 9 are arranged at the front (to the left in FIGS. 1 and 2) of the pantograph support 7 and comprise an electric motor 26, reduction gearing 27 and a driving arm 28.

The electric motor 26 is fixed by a support 29 to the roof 2 of the railway vehicle 3. Its output shaft, not depicted, is parallel to the longitudinal direction L and orientated towards the rear. This output shaft is connected to the reduction gearing 27 via an electric insulator 30.

Figure 3:
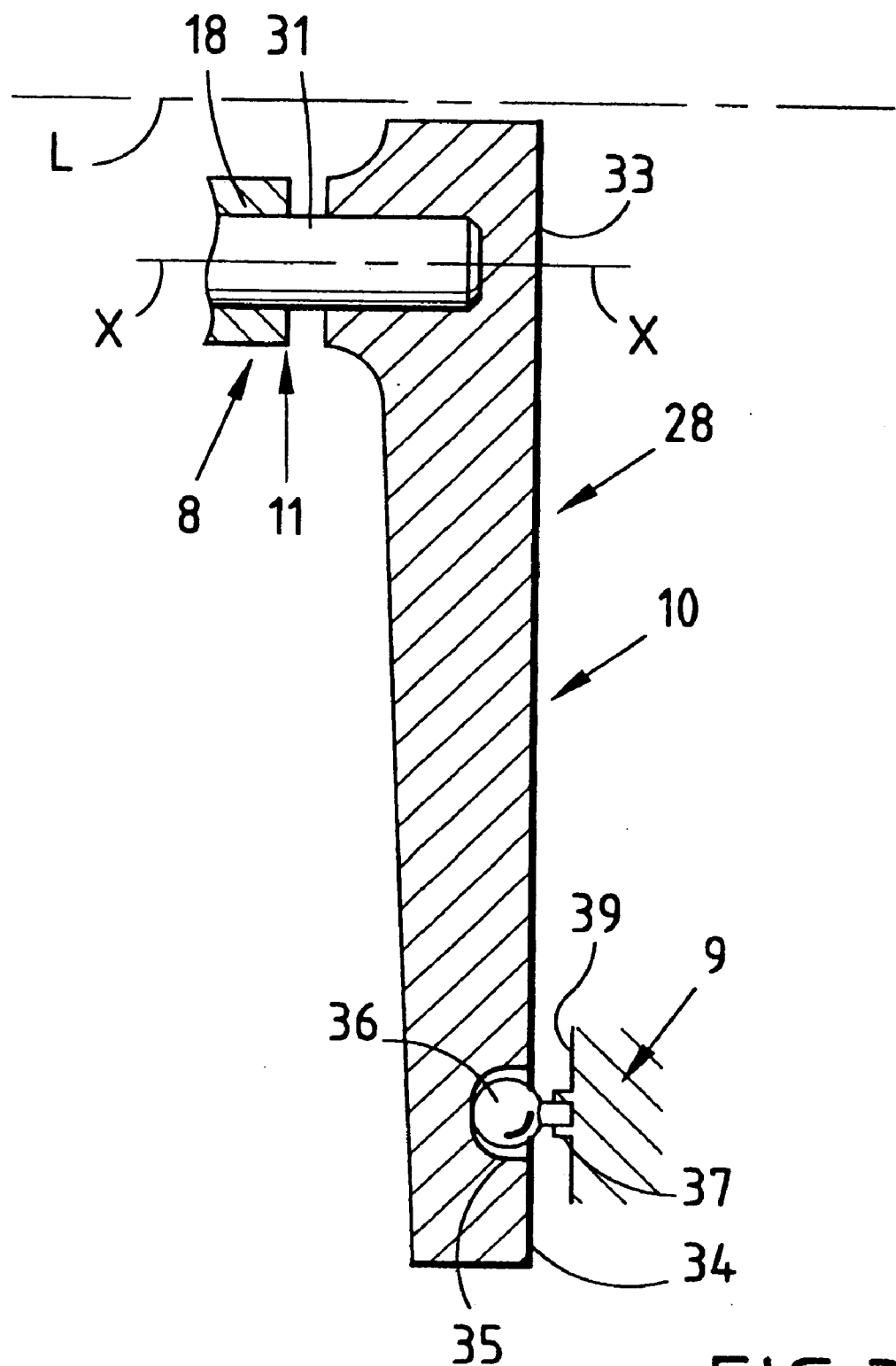
FIG. 3 is an enlarged diagrammatic view in longitudinal section illustrating the link between the movement means and the mobile chassis of FIGS. 1 and 2, and FIGS. 4 and 5 are diagrammatic transverse views illustrating the railway vehicle of FIG. 1 in a position of rest and in a tilted position, respectively.

The reduction gearing 27 is flange-mounted on the front side 18 of the frame 11 of the stationary chassis 8. Its output shaft 31 (FIG. 3) is parallel to the longitudinal direction L and extends from the front side 18 of the stationary chassis 8 rearwards slightly.

The upper end 33 of the driving arm 28 is fixed to this output shaft 31 so that the arm 28 can pivot on the action of the motor 26 laterally about an axis X—X parallel to the longitudinal direction L.

The lower end 34 of the arm 28 has an oblong groove 35 extending in the lengthwise direction of the arm 28, on the rear side thereof. This slightly oblong groove 35 takes a ball 36 fixed on a stub 37 which projects forwards from the front side 39 of the mobile chassis 9. The ball 36 and the oblong groove 35 form, between the driving arm 28 and the mobile chassis 9, a link which allows pivoting and radial sliding with respect to the axis X—X.

As illustrated diagrammatically by FIG. 4, the ball 36, which corresponds to the point of articulation of the arm 28 to the mobile chassis 9, is situated at the centre of the short base of the trapezium formed by the points of articulation 17 and 22. Thus, the point of articulation 36 is located laterally mid-way between the points 22 about which the tilting supports 14 are articulated to the mobile chassis 9.

Likewise, the axis X—X about which the arm 28 can pivot is located laterally mid-way between the points 17 about which the tilting supports 14 are articulated to the stationary chassis 8. This axis X—X is located slightly below the level of these points of articulation 17. However, the axis X—X has, for reasons of clarity, been depicted on the long base of the trapezium formed transversely by the points of articulation 17 and 22.

The lower end of the arm 5 of the pantograph 4 is connected to the mobile chassis 9 in such a way as to secure the arm 5 and the mobile chassis 9 laterally.

The tilting supports 14 are therefore arranged laterally on each side of the pantograph 4.

In the conventional way, the arm 5 is deformable between a deployed power pick-up position and a folded space-minimizing position, to allow the collector bow 6 a movement of vertical translation above the roof 2.

In its deployed position, illustrated in dotted line in FIG. 4, a central region 43 of the collector bow 6 of the pantograph 4 is pressing against a contact line 44 of a set of overhead power lines over the top of the railway vehicle 3.

In the folded position (FIG. 1), the intermediate articulation 45 of the arm 5, connecting its lower portion 46 and its upper portion 47, is located to the rear of the pantograph support 7.

Figure 5:
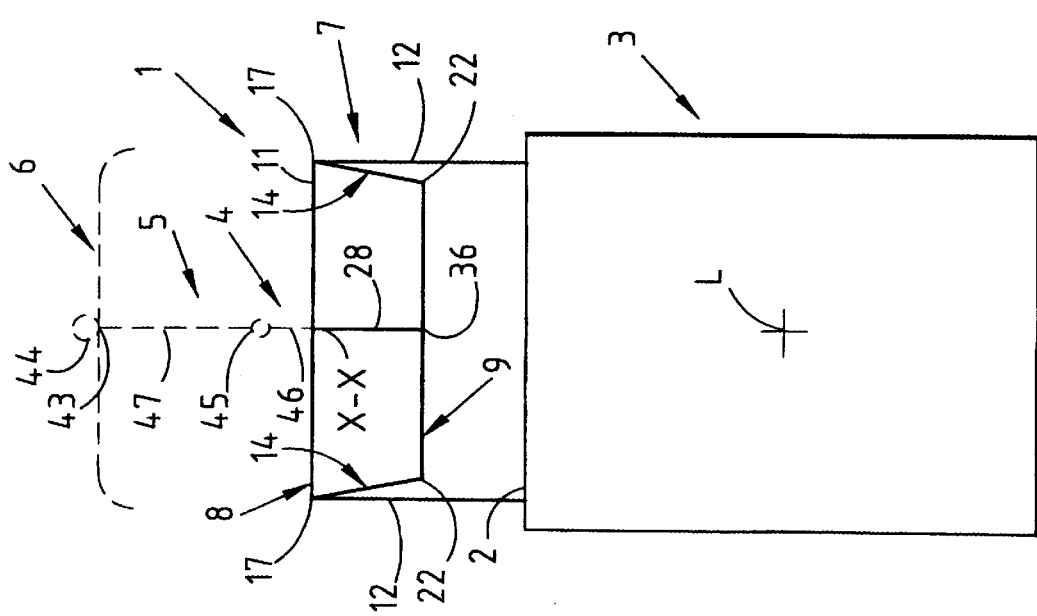

When the railway vehicle 3 is running along a curved part of railway line, its body, and therefore the roof 2 adopts a lateral inclination α towards the centre of curvature of the track, for example towards the left as illustrated in FIG. 5.

The motor 26 is therefore commanded by a control unit, not depicted, to cause the arm 28 to pivot laterally in the opposite direction, that is to say towards the right in FIG. 5. The mobile chassis 9 is therefore moved laterally with respect to the stationary chassis 8 under the action of the driving arm 28 so that the arm 5 of the pantograph 4 is kept roughly vertical or orthogonal to the railway line.

Thus, the collector bow 6 is kept roughly horizontal or parallel to the plane of the railway line and the contact line 44 of the overhead power line is kept in contact with the central region 43 of the collector bow 6.

It will be observed that when the mobile chassis 9 moves laterally in the vicinity of its position of rest, by deformation of the quadrilateral formed transversely by the points of articulation 17 and 22, the point of articulation 36 moves practically in an arc of a circle 49 (FIG. 5) centred on the axis X—X.

Thus, the arm 28 for driving the mobile chassis 9 makes it possible for the chassis to be moved satisfactorily to provide the pantograph 4 with tilt compensation.

In general, the stationary chassis 8 and the mobile chassis 9 and the links between these will be designed so that the point of articulation 36 roughly describes an arc of a circle when the mobile chassis 9 tilts with respect to the stationary chassis 8 so as to provide tilt compensation for angles of tilting smaller than 10°.

In practice, the sliding link between the lower end 34 of the arm 28 and the mobile chassis 9 makes it possible to absorb the small radial misalignments of the ball 36 with respect to the arc of a circle 49.

Incidentally, the tilting rigid supports 14 provide the mobile chassis 9 with satisfactory lateral guidance and limited rubbing. The presence of the tilting supports 14 means that the two lateral rams and guides hitherto needed for satisfactorily driving the mobile chassis 9 can therefore be dispensed with.

The tilting rigid supports 14 therefore play a part in, on the one hand, limiting the size of the power pick-up assembly 1 and, on the other hand, obtaining effective tilt compensation for the pantograph.

It will also be noted that the transverse profile of the tilting supports 14, with their concave aspect facing towards the inside of the pantograph support 7, makes it possible to obtain a wide angular excursion of the pantograph supports 14 in a small volume. This characteristic makes it possible to reduce the bulk of the power pick-up assembly 1 still further.

Furthermore, the structure of the support 7 for supporting the pantograph 4 allows the use of a pantograph 4 of conventional structure.

What is claimed is:

1. Power pick-up assembly for a railway vehicle, of the type comprising a pantograph and a pantograph support, the pantograph support comprising a stationary chassis for mounting on the roof of a railway vehicle, and a mobile chassis carrying the pantograph and connected to the stationary chassis to tilt laterally with respect thereto on each side of a position of rest, wherein the mobile chassis is connected to the stationary chassis by two tilting rigid lateral supports having a transverse profile with a concave aspect facing towards the inside of the power pick-up assembly, each tilting support comprising a yoke articulated by branches to the stationary chassis at two longitudinally-spaced points, and two clevis mounts which extend the base of the yoke and which are roughly orthogonal to the branches of the yoke, said two clevis mounts being articulated to the mobile chassis at two longitudinally-spaced points.

2. Assembly according to claim 1, wherein the points by which the tilting supports are articulated to the mobile and stationary chassis form, transversely, a trapezium which converges downwards when the power pick-up assembly is mounted on the roof of a railway vehicle and when the mobile chassis is in the position of rest.

3. Railway vehicle comprising a power pick-up assembly mounted on the roof of the vehicle, characterized in that the power pick-up assembly is an assembly according to claim 1.

4. Assembly according to claim 1, wherein each tilting support forms two laterally spaced pivoting links, said pivoting links allowing the mobile chassis to tilt laterally with respect to the stationary chassis on each side of a position of rest.

5. Assembly according to claim 4, wherein the mobile chassis tilts laterally by deformation of a trapezium formed transversely by the points.

6. Power pick-up assembly for a railway vehicle, of the type comprising a pantograph and a pantograph support, the pantograph support comprising a stationary chassis for mounting on the roof of a railway vehicle, and a mobile chassis carrying the pantograph and connected to the stationary chassis to tilt laterally with respect thereto on each side of a position of rest, wherein the mobile chassis is located inside the stationary chassis and connected to the stationary chassis by two tilting rigid lateral supports having a transverse profile with a concave aspect facing towards the inside of the power pick-up assembly, each tilting support comprising a yoke articulated by branches to the stationary chassis at two longitudinally-spaced points, and two clevis mounts which extend the base of the yoke and which are roughly orthogonal to the branches of the yoke, said two clevis mounts being articulated to the mobile chassis at two longitudinally-spaced points.

7. Assembly according to claim 6, wherein the points by which the tilting supports are articulated to the mobile chassis and the stationary chassis form, transversely, a trapezium which converges downward when the power pick-up assembly is mounted on the roof of a railway vehicle and when the mobile chassis is in a position of rest.

8. Assembly according to claim 6, wherein each tilting support forms two laterally spaced pivoting links, said pivoting links allowing the mobile chassis to tilt laterally with respect to the stationary chassis on each side of a position of rest.

9. Assembly according to claim 8, wherein the mobile chassis tilts laterally by deformation of a trapezium formed transversely by the points.

10. Railway vehicle comprising a power pick-up assembly mounted on the roof of the vehicle, characterized in that the power pick-up assembly is an assembly according to claim 6.

* * * * *